United States Patent
McMahan et al.

(10) Patent No.: US 7,204,123 B2
(45) Date of Patent: Apr. 17, 2007

(54) ACCURACY ENHANCEMENT OF A SENSOR DURING AN ANOMALOUS EVENT

(75) Inventors: Lisa E. McMahan, Tampa, FL (US); Joseph G. Protola, Clearwater, FL (US); Bruce Wayne Castleman, Pinellas Park, FL (US)

(73) Assignee: Honeywell International Inc., Morristown, NJ (US)

( * ) Notice: Subject to any disclaimer, the term of this patent is extended or adjusted under 35 U.S.C. 154(b) by 94 days.

(21) Appl. No.: 10/842,063

(22) Filed: May 10, 2004

(65) Prior Publication Data

US 2005/0210952 A1 Sep. 29, 2005

Related U.S. Application Data

(60) Provisional application No. 60/557,109, filed on Mar. 26, 2004.

(51) Int. Cl.
*G01P 21/00* (2006.01)
(52) U.S. Cl. ..................................... 73/1.37
(58) Field of Classification Search ........ 73/1.37–1.39; 324/602; 702/141
See application file for complete search history.

(56) References Cited

U.S. PATENT DOCUMENTS

| | | | | |
|---|---|---|---|---|
| 4,385,699 A | * | 5/1983 | Ashina | 209/538 |
| 4,488,189 A | * | 12/1984 | Axmear et al. | 360/78.04 |
| 4,606,316 A | * | 8/1986 | Komurasaki | 123/406.16 |
| 4,712,427 A | | 12/1987 | Peters | 73/514.29 |
| 5,175,438 A | * | 12/1992 | Ikeda | 250/574 |
| 5,371,718 A | * | 12/1994 | Ikeda et al. | 367/91 |
| 5,479,161 A | * | 12/1995 | Keyes et al. | 340/870.04 |
| 5,621,776 A | * | 4/1997 | Gaubatz | 376/242 |

FOREIGN PATENT DOCUMENTS

JP 63046961 A * 2/1988

OTHER PUBLICATIONS

Honeywell, Accelerex RBA500 Accelerometer, Jan. 2001, Publisher: Honeywell International Inc. (2 pgs.).

* cited by examiner

*Primary Examiner*—Hezron Williams
*Assistant Examiner*—Tamiko Bellamy
(74) *Attorney, Agent, or Firm*—Fogg & Powers LLC

(57) ABSTRACT

A method for enhancing the accuracy of a sensor is provided. The method includes determining a measure of the output of the sensor, determining whether the measure falls outside of an acceptable range for the output of the sensor, and, when the measure falls outside the acceptable range, modifying the measure of the output such that the measure falls within the acceptable range for the sensor.

22 Claims, 6 Drawing Sheets

ACCURACY ENHANCEMENT OF A SENSOR DURING AN ANOMALOUS EVENT

CROSS REFERENCE TO RELATED APPLICATIONS

This application is related to, and claims the benefit of the filing date of U.S. Provisional Application No. 60/557,109, filed on Mar. 26, 2004.

GOVERNMENT LICENSE RIGHTS

The U.S. Government may have certain rights in the present invention as provided for by the terms of Lockheed Subcontract No. LH01N1801N/DASG60-00-C-0072 awarded by the Dept. of Army.

BACKGROUND

Many modern guidance and navigation systems use vibrating beam sensors to measure parameters used in controlling the flight path of aircraft, missile, or other flight vehicle. Vibrating beam sensors typically depend upon crystal beam oscillators to provide a frequency output that changes frequency as strain in the beam changes. As an example, in a typical accelerometer application, the beam is connected to a proof mass supported by flexures connected to another structure. When the proof mass is acted upon by acceleration, the proof mass deflects about the flexures, and stretches or compresses the crystal beam. In some applications, two crystal beams are used in such a way that one is compressed and the other is stretched as the proof mass deflects. The frequency of the beam in tension increases and that of the beam in compression decreases. In these types of accelerometers both frequencies are used to provide better performance.

An example of an accelerometer with two crystal beams is the Accelerex® RBA-500, made by Honeywell Inc., Redmond, Wash. In this accelerometer, the crystal beams are driven at one of their natural resonant frequencies and the oscillations generate nearly sinusoidal waveforms in closed loop electronics. The sinusoidal waveforms are internally, electronically converted to square wave output signals from the accelerometer.

The frequency output of a crystal beam accelerometer is dependent on the input acceleration. The frequency output is limited by the mechanical structure of the accelerometer as well as its internal electronics. Further, deflection of the proof mass is limited by physical stops. The stops are designed to allow the desired acceleration dynamic range for the accelerometer. Further, the stops limit the travel of the proof mass to keep from damaging the crystals and flexures from excessive strain. Since the proof mass deflection is limited, the strain in the crystal beams should be limited and the expected frequency change of the crystal beams should fall within an established frequency band. If the acceleration exceeds the magnitude at which the proof mass hits the stops, it is expected that the frequency output of the crystal beams would be limited to the values corresponding to the proof mass deflected at the stops. For example, the nominal output of an RBA-500 is two square waves with frequencies of 35 kHz. The frequencies vary with acceleration until the stops are contacted. When the stops are contacted, the frequency of one crystal is about 30 kHz and the frequency of the other crystal is about 40 kHz. These are only illustrative values and will vary for each accelerometer.

Typically, guidance and navigation systems determine the meaning of the output signals of the accelerometer with digital electronics. In some systems, the digital electronics count the number of rising or falling edges in a square wave signal output by the accelerometer. This provides a measure of the frequency of the output signal and, in turn, a measure of acceleration since the frequency of the output signal is related to the acceleration.

Unfortunately, the crystals of an accelerometer are known to output higher frequencies or lower frequencies than normal under high dynamic environments. This may be due to other resonant frequencies of the crystal beams or it may be due to transient strains on the crystal beams as a result of high velocity paddle impacts with the stops. The number of occurrences and the duration of the occurrences are unpredictable.

The anomalous output of higher or lower frequencies can lead to a greater or lesser number of counts than should be possible, leading to the types of errors already described. The effect of these higher or lower than expected counts is to cause the acceleration and velocity to be incorrectly computed, leading to an apparent velocity shift and a subsequent error in guidance or navigation.

Therefore, there is a need in the art for enhancing the accuracy of the output of a sensor.

SUMMARY

Embodiments of the present invention address problems with sensors which can be solved by enhancing the accuracy of the output of the sensor during anomalous events. In one embodiment, errors in vibrating beam sensors are reduced by eliminating output frequencies that have impossible values under normal operation. The signals being processed may be analog or digital. In one embodiment, the method includes determining a measure of the output of the sensor. The method further includes determining whether the measure falls outside of an acceptable range for the output of the sensor. When the measure falls outside the acceptable range, the method modifies the measure of the output such that the measure falls within the acceptable range for the sensor.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Figure 1:
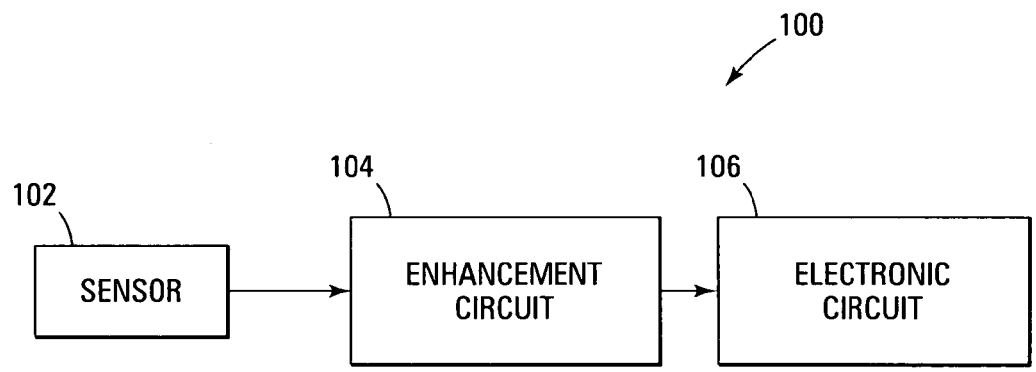
FIG. 1 is a block diagram of one embodiment of system with a sensor with enhanced accuracy during an anomalous event.

FIG. 1 is a block diagram of one embodiment of system, indicated generally at 100, that enhances the accuracy of a sensor 102 during an anomalous event. For purposes of this specification, an anomalous event is an event that causes the sensor 102 to provide an output that is outside a range of normally expected outputs for the sensor. This output is also referred to herein as an "anomalous" output.

System 100 includes enhancement circuit 104 coupled between sensor 102 and electronic circuit 106. In one embodiment, sensor 102 comprises an accelerometer or other appropriate sensor for monitoring a selected stimulus. In one embodiment, sensor 102 comprises a vibrating beam accelerometer. Further, in one embodiment, sensor 102 comprises a vibrating beam accelerometer with two complementary, vibrating beams such as the Accelerex® RBA-500 commercially available from Honeywell International, Redmond, Wash. In other embodiments, sensor 102 comprises any other appropriate sensor that is subject to a definable range for output signals such that an anomalous event may be detected based on the output of the sensor 102. In other embodiments, sensor 102 comprises any appropriate device with a known range of physically possible values being output as either an analog or digital signal, which makes dynamic measurements in the form of a frequency shift of a modulated oscillation frequency (i.e. resonant frequency as a function of the stress/strain applied).

In one embodiment, electronic circuit 106 comprises a guidance and navigation system used, for example, in an aircraft, missile or other flight vehicle. In further embodiments, the electronic circuit 106 comprises any appropriate circuit or system that uses the output of a sensor 102 in its operation.

Enhancement circuit 104 receives the output of sensor 102. Enhancement circuit 104 determines when the output of sensor 102 is not within the normal operating range for sensor 102. Further, enhancement circuit 104 provides a signal to electronic circuit 106. When the output of sensor 102 is within its normal operating range, enhancement circuit 104 provides the output of sensor 102 to electronic circuit 106. When the output of sensor 102 is not within its normal operating range, enhancement circuit 104 enhances the output of sensor 102 by not passing the anomalous output to electronic circuit 106. In one embodiment, enhancement circuit 104 passes a nominal value within the normal operating range of the sensor. In other embodiments, enhancement circuit 104 passes a value extrapolated from other values output by sensor 102.

In embodiments based on a sensor with two crystal oscillator beams, such as the Accelerex® RBA-500, an additional technique is available to enhance the accuracy of the sensor. It is the nature of this device that one crystal beam is in a state of tension when the other is in a state of compression and the two frequencies are displaced from their unstrained value by approximately the same amount but with different signs. In other words, the nominal value of both crystals may be 35 kHz. When subjected to an acceleration, one crystal may read 33 kHz and the other 37 kHz. That is, both are displaced 2 kHz, but in opposite directions from the nominal. It is highly unlikely that both crystals will experience the anomalous behavior at exactly the same time. It is highly probable that when one crystal is experiencing a problem, the other one will be providing good data. Therefore, the accuracy of the sensor 102 can be enhanced during anomalous events by using the data from the good crystal, e.g., the crystal with the value within the normal operating range. From this value, the response expected from the anomalous crystal is calculated and passed to electronic circuit 106. In most cases, this will be a more accurate adjustment of the device's output during anomalous events than simply using a nominal or extrapolated value.

In operation, enhancement circuit 104 receives the output of sensor 102, and, selectively modifies the output of sensor 102 when an anomalous output is detected. When the output of sensor 102 is not within the expected range of its normal operation, it is presumed that the output is in error. This means that the output of the sensor is not an accurate reflection of the stimulus that the sensor is designed to monitor. If the error is allowed to propagate to the electronic circuit 106, the operation of electronic circuit 106 is likely to be compromised since the error may be magnified when relied on in further operations by electronic circuit 106. In one embodiment, enhancement circuit 104 advantageously overcomes this problem during an anomalous event by providing a value to electronic circuit 106 that is within the normal range of the output of sensor 102 as discussed above. By enhancing the output from sensor 102 during anomalous events in this manner, enhancement circuit 104 improves the performance of electronic system 106 by reducing the impact of incorrect readings from sensor 102 on the operation of electronic system 106.

Figure 2:
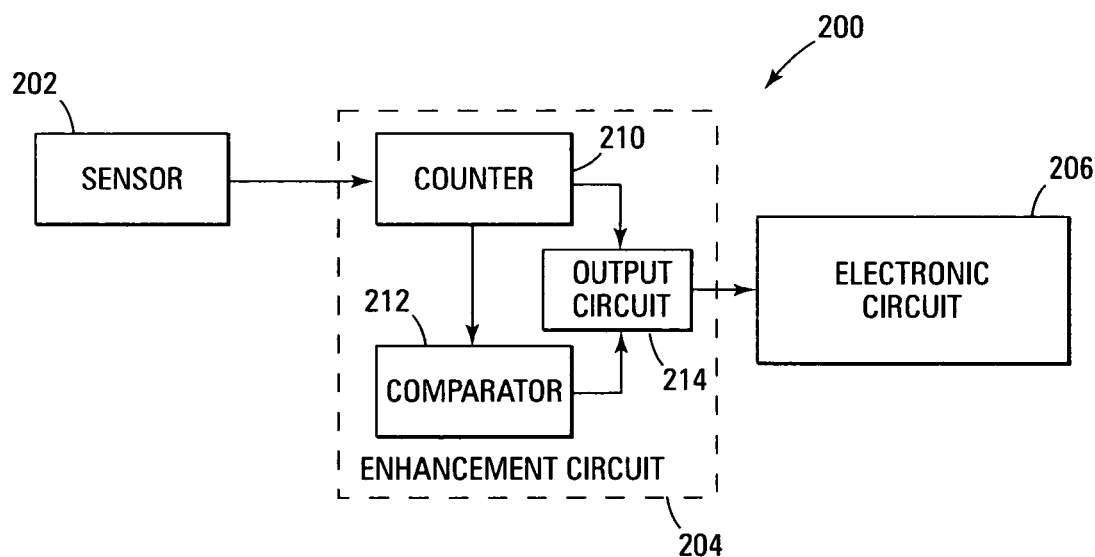
FIG. 2 is a block diagram of another embodiment of system with a sensor with enhanced accuracy during an anomalous event.

FIG. 2 is a block diagram of another embodiment of system, indicated generally at 200, with a sensor 202 with enhanced accuracy during an anomalous event. In this embodiment, sensor 202 is an accelerometer with a square wave output. The frequency of the square wave output of sensor 202 is dependent on the acceleration applied to the sensor 202. In one embodiment, the sensor 202 is an Accelerex® RBA-500 with a square wave output with a nominal frequency of 35 kilohertz (KHz) at zero acceleration or "zero g's." The operating range of the RBA-500 is typically in the range from 35 to 42 KHz for one vibrating beam and 28 to 35 KHz for the other vibrating beam.

Enhancement circuit 204 determines when the output of sensor 202 is not within the expected or normal operating range. Enhancement circuit 204 receives the output of sensor 202 at counter 210. Counter 210 is programmed to count the number of leading edges in the output of sensor 202. In one embodiment, the output of sensor 202 is monitored over 0.5 millisecond (ms) intervals. With this time interval, the expected number of leading edges for one beam is 17.5 to 21 given a frequency range from 35 to 42 KHz. This count values is provided to output circuit 214.

Enhancement circuit 204 determines when the output of sensor 202 falls outside the normal operating range using comparator 212. In one embodiment, comparator 212 compares the output of one beam with the maximum 22.5. If the count exceeds this value, then comparator 212 provides a signal to output circuit 214 that indicates that sensor 202 has provided an anomalous reading. Otherwise, if the count falls below this value, then the comparator 212 provides a signal to output circuit 214 that indicates that the sensor 202 output is acceptable.

Output circuit 214 provides an output to electronic circuit 206 based on the value produced by counter 210 and the output of comparator 212. When comparator 212 determines that the output of sensor 202 is within its normal operating range, then output circuit 214 provides the value output by counter 210 to electronic circuit 206. When comparator 212 determines that the output of sensor 202 is not within its normal operating range, then output circuit 214 provides a value other than the output of counter 210 to electronic circuit 206. For example, in one embodiment, output circuit 214 provides a value of 17.5 to the electronic circuit 206. In other embodiments, output circuit 214 provides a value extrapolated from other counts produced by counter 210. In yet further embodiments, output circuit 214 generates a value within the normal operating range based on a count value for another vibrating beam in sensor 202. For example, when one beam produces a count that exceeds 21 and the other, complementary beam produces a value within its acceptable range, e.g., 15, the output circuit determines a value in the range from 17.5 to 21 that corresponds with the value produced by the other beam, e.g., 20.

Figure 3:
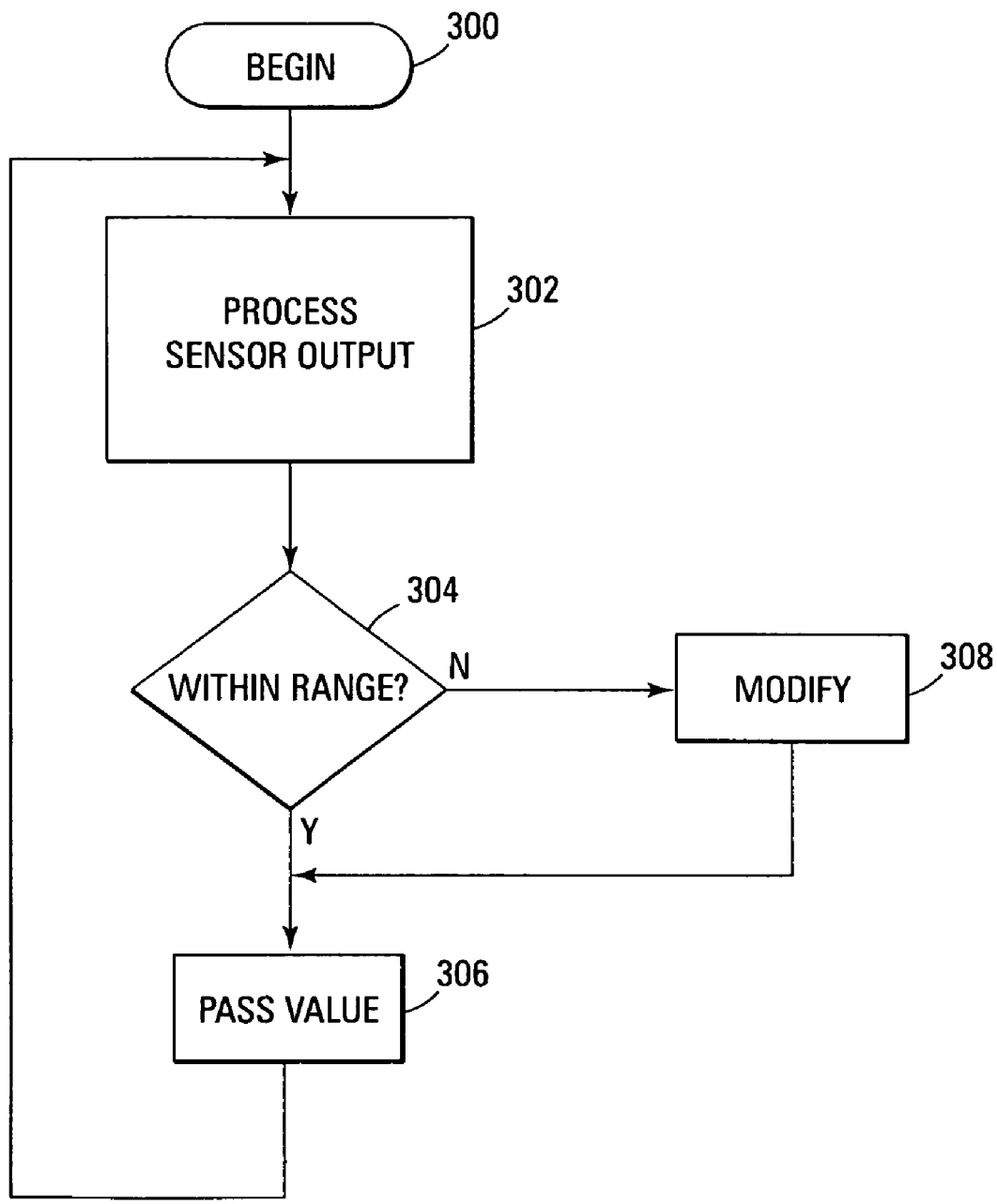
FIG. 3 is a flow chart of one embodiment of a process for enhancing the accuracy of a sensor during an anomalous event.

FIG. 3 is a flow chart of one embodiment of a process for enhancing the accuracy of a sensor during an anomalous event. The process begins at block 300. At block 302, the process determines a measure of the sensor output. In one embodiment, the process analyzes a square wave output. In this embodiment, the process counts the number of leading edges in the output signal during a specified interval, e.g., 0.5 ms. At block 304, the process determines whether the measure of the sensor output falls in an expected range. In one embodiment, the expected range is determined by physical and electrical characteristics of the sensor. For example, with the RBA-500, the output range of the accelerometer is limited to a square wave with a frequency bounded between 35 KHz and 42 KHz. With this sensor, the range of expected counts is from 17.5 to 21 in a 0.5 ms interval.

If the measure is within the range, the output is passed without correction at block 306. If, however, the measure is not within the range, the output is modified at block 308. In one embodiment, the output is replaced with a value that is within the expected range, e.g., a measure over 21 would be replaced with a measure of 17.5. In other embodiments, the measure is replaced with a value chosen by interpolation between values produced by the sensor that fall within the range. In yet further embodiments, the value is replaced with a value dependent on another output of the sensor that falls within the range during the anomalous event.

Figure 4:
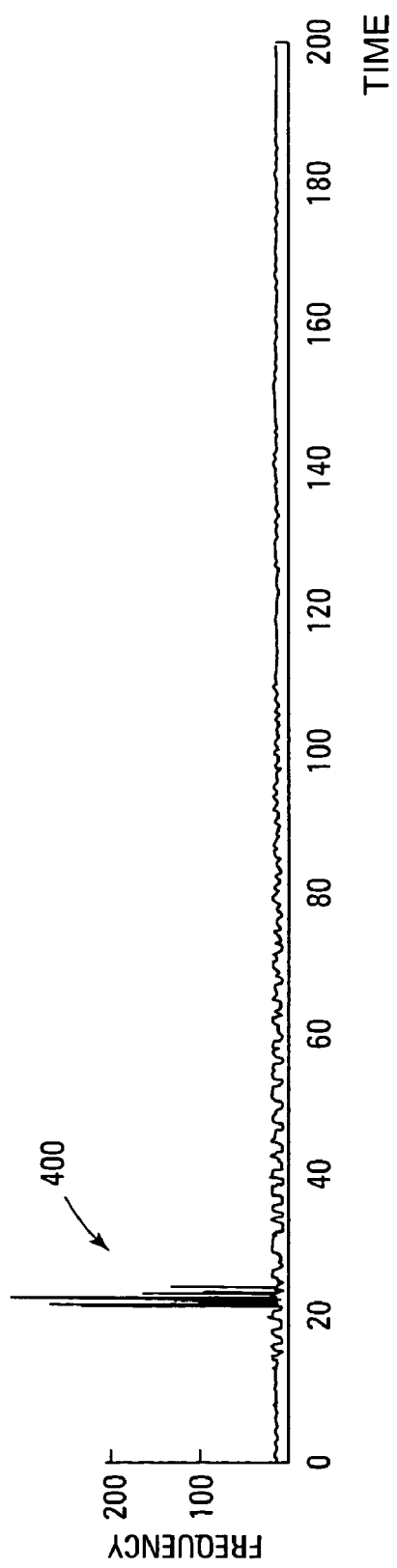
FIG. 4 is a graph that illustrates an example of the output of a sensor with an anomalous event.
Figure 5:
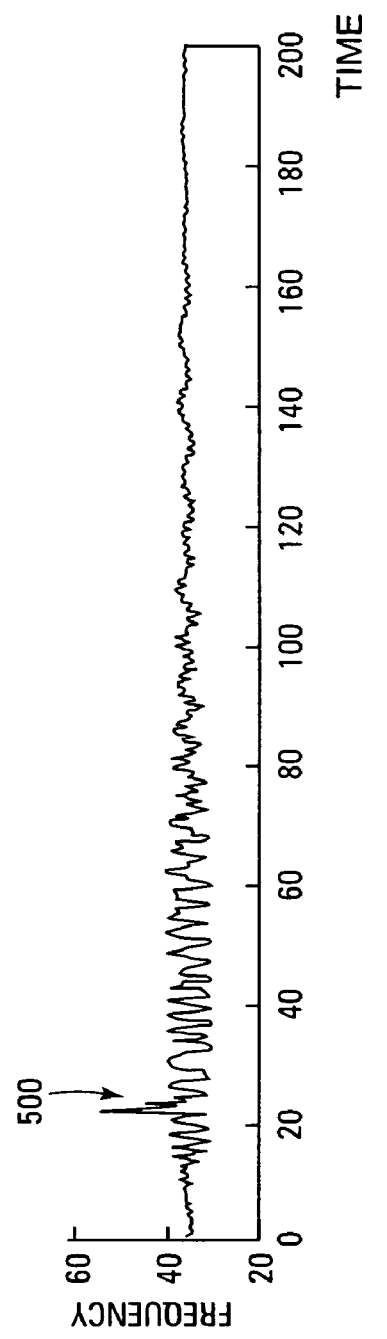
FIG. 5 is a graph of a corrected output of the example of FIG. 3 using an existing correction technique.
Figure 6:
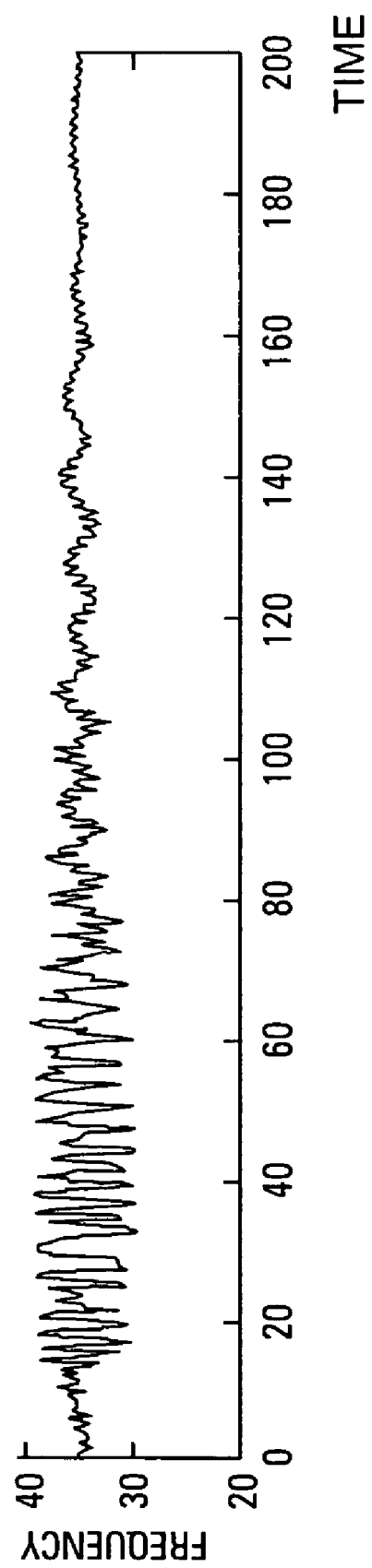
FIG. 6 is a graph of a corrected output of the example of FIG. 3 with correction of the sensor output according to an embodiment of the present invention.

FIG. 4 is a graph that illustrates an example of the output of a sensor with an anomalous event. In the graph, the output of a sensor, e.g., the frequency of the output of an Accelerex® RBA-500 accelerometer is plotted along the vertical axis. The horizontal axis represents the time at which the accelerometer reading was taken in milliseconds. As indicated at 400, an anomalous event occurs between 20 and 40 milliseconds. This event is detectable because the frequency of the output of the sensor exceeds the nominal 35 to 42 KHz expected range. In FIG. 5, the output of the signal is time-averaged to attempt to reduce the impact of the anomalous event. As can be see at 500, the output of the sensor still falls outside the normal range for a portion of the time between 20 and 40 milliseconds. In FIG. 6, anomalous readings from a sensor are replaced with a nominal output that falls within the acceptable range for the sensor. With this replacement, the sensor output falls within its normal operating range during the full 200 ms interval. The effect of this replacement technique is shown by comparing the graphs of FIGS. 7 and 8.

Figure 7:
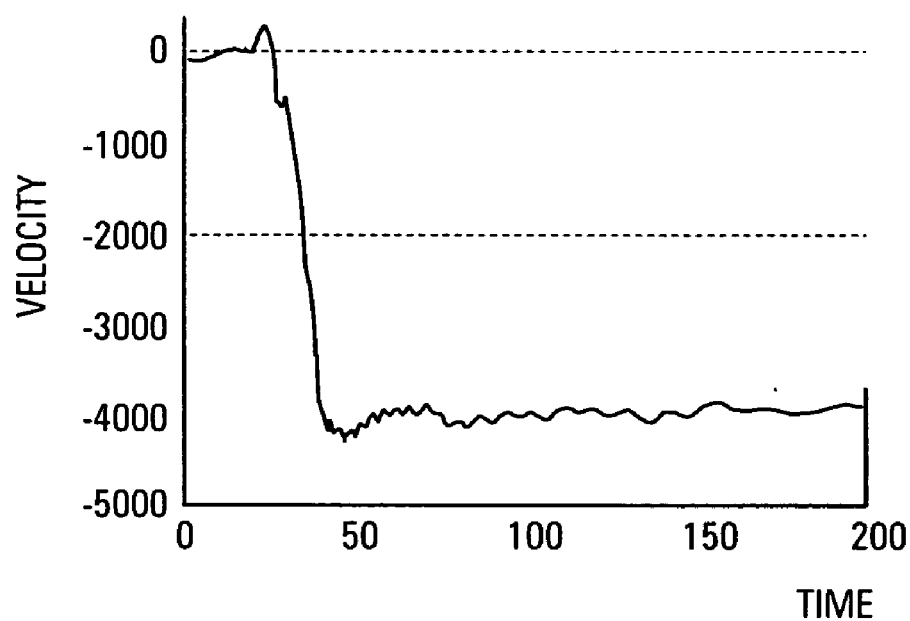
FIG. 7 is a graph that illustrates a signal generated based on the output of the sensor during an anomalous event using existing techniques correct the sensor output.
Figure 8:
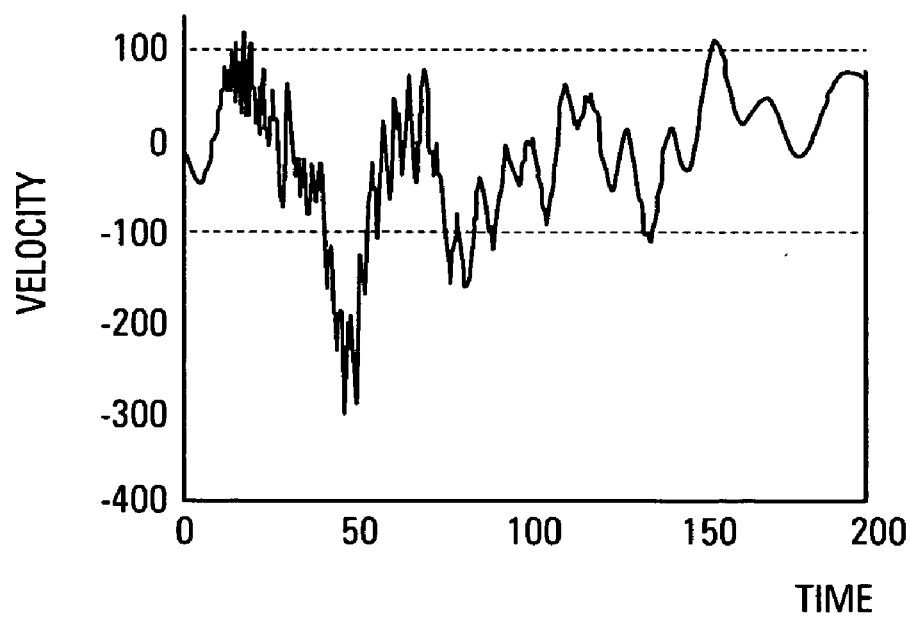
FIG. 8 is a graph that illustrates a signal generated based on the output of the sensor during an anomalous event with the sensor output corrected according to an embodiment of the present invention.

FIG. 7 is a graph that illustrates the velocity along the vertical axis and time along the horizontal axis. This graph illustrates one example of the output of a system that uses a sensor reading with an unmodified anomalous event. It can be seen that during the anomalous event, a velocity shift of over 4000 cm/s was reported based on the sensor reading. This is an unacceptable velocity shift. FIG. 8 is a graph that illustrates the velocity versus time curve when the sensor output is modified to remove any values outside the nominal range expected of the sensor. As can be seen from the graph, by removing the values that fall outside the normal operating range and replacing the values with a nominal 17.5 count, the 4000 cm/s velocity shift is removed. Thus, the accuracy of the output of the sensor is enhanced.

Figure 9:
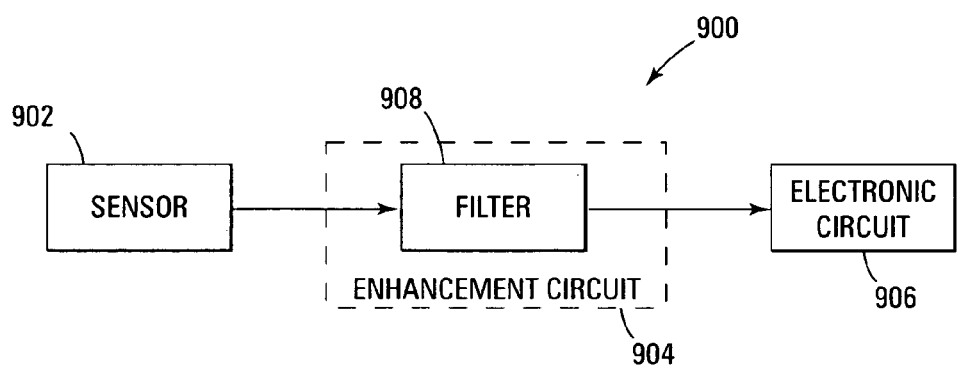
FIG. 9 is a block diagram of another embodiment of system with a sensor with enhanced accuracy during an anomalous event.

FIG. 9 is a block diagram of another embodiment of a system, indicated generally at 900, for providing enhanced operation of a sensor 902. In the system 900, sensor 902 is coupled to electronic circuit 906 through enhancement circuit 904. As in the other embodiments, enhancement circuit 904 enhances the accuracy of the output of sensor 902 by suppressing outputs from sensor 902 that are not within the normal operating range of the sensor 902. In this embodiment, enhancement circuit 904 comprises filter 908. The sensor 902 produces an output signal with a frequency that is related to a measured stimulus. The sensor 902 produces an analog signal. The bandwidth of filter 908 is chosen such that signals with frequencies within the normal operating range of sensor 902 are passed and signals with other frequencies are suppressed. A bandpass filter, well known in the state of the art, can be designed to pass only frequencies above a certain value and below a certain, but higher value. For example, if the lowest and highest frequencies expected are 30 kHz and 40 kHz, a 6 db/octave bandpass filter is used to pass 30–40 kHz sinewaves unattenuated and frequencies outside this range would be highly attenuated. The subsequent processing and computations in electronic circuit 906, whether analog or digital, would only have realistic values to process, leading to greater accuracy.

Figure 10:
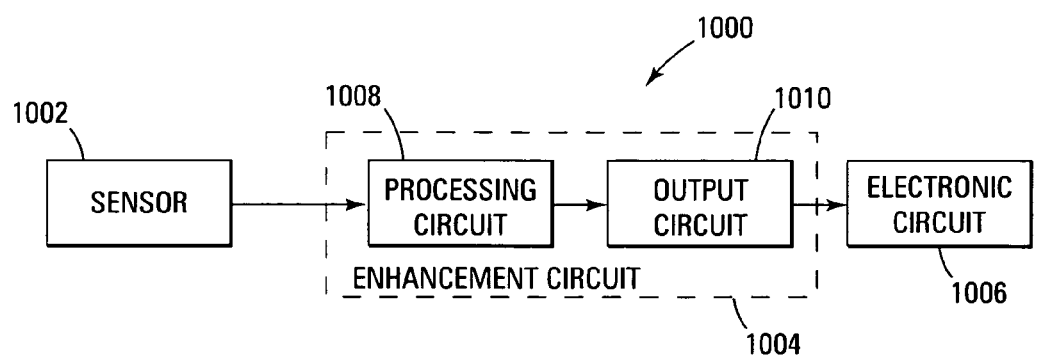
FIG. 10 is a block diagram of another embodiment of system with a sensor with enhanced accuracy during an anomalous event.

FIG. 10 is a block diagram of another embodiment of a system, indicated generally at 1000, for providing enhanced operation of a sensor 1002. In the system 1000, sensor 1002 is coupled to electronic circuit 1006 through enhancement circuit 1004. As in the other embodiments, enhancement circuit 1004 enhances the accuracy of the output of sensor 1002 by suppressing outputs from sensor 1002 that are not within the normal operating range of the sensor 1002. In this embodiment, enhancement circuit 1004 comprises processing circuit 1008 and output circuit 1010. The sensor 1002 produces an output signal with a frequency that is related to a measured stimulus. In one embodiment, the sensor 1002 produces an analog signal and in other embodiments, sensor 1002 produces a digital signal. Processing circuit 1008 determines the frequency of the output of the sensor 1002. If the frequency is within the normal operating range of sensor 1002, then output circuit 1010 passes the signal to electronic circuit 1006. If, however, the processing circuit 1008 determines that the frequency of the output signal is not within the normal operating range, then the output circuit suppresses the signal from sensor 1002. In one embodiment, a signal is substituted for the signal from sensor 1002. For example, a signal at a nominal operating point of the sensor 1002 is forwarded to electronic circuit 1006 by output circuit 1010. In other embodiments, an interpolated value is provided by output circuit 1010 to electronic circuit 1006. In further embodiments, a value is passed by output circuit 1010 to electronic circuit 1006 based on other data from sensor 1002.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

It is apparent that these techniques will work for any source of transients or noise on the signals, whether from shocks, vibration, electronic noise or other sources. Therefore, embodiments of this invention are useful for any device that has limited bandwidth that can define boundaries beyond which the data (frequencies, counts, etc.) are detectable as invalid. It is particularly effective where there are multiple outputs which have a relationship with each other, such as the two square wave output signals in the RBA-500.

A number of embodiments of the invention defined by the following claims have been described. Nevertheless, it will be understood that various modifications to the described embodiments may be made without departing from the scope of the claimed invention.

In FIGS. 1–10, the exemplary embodiments have been described in terms of improving the accuracy of an accelerometer. It is understood that this application is not limited to improving the accuracy of an accelerometer. The sensors 102, 202, 902 and 1002 are implemented in other embodiments as other types of sensors. For example, in some embodiments, the sensors are implemented as strain sensors. In other embodiments, the sensors are implemented as micro-electro-mechanical systems (MEMS) sensors. Many MEMS accelerometers and gyros have a very similar output to the Accelerex® RBA-500. In other embodiments, the sensors include piezoelectric sensors. Crystals, which acquire a charge when compressed, twisted or distorted are said to be piezoelectric. This provides a convenient transducer effect between electrical and mechanical oscillations. Quartz demonstrates this property and is extremely stable. Quartz crystals are used for watch crystals, precise frequency reference crystals for radio transmitters, precision accelerometers, etc. An oscillating electric field makes the quartz crystal resonate at its natural frequency. The vibrations of this frequency are counted and are used to keep the clock or watch on time. Barium titanate, lead zirconate, and lead titanate are ceramic materials which exhibit piezoelectricity and are used in ultrasonic transducers as well as microphones. If and electrical oscillation is applied to such ceramic wafers, they will respond with mechanical vibrations which provide the ultrasonic sound source. The standard piezoelectric material for medical imaging processes has been lead zirconate titanate (PZT). Piezoelectric ceramic materials have found use in producing motions on the order of nanometers in the control of scanning tunneling microscopes. In other embodiments, the sensors are microphones. Microphones are used to convert acoustical energy into electrical energy. The microphone serves as an example of the idea that a specific purpose can be accomplished using many different physical principles.

In other embodiments, the sensors are biopotential sensors. The surface recording electrode can be used to measure many different biopotentials. For, example, it can be used to measure electrical signals generated from the flexion and extension of the muscles. This signal is referred to as the electromyogram or EMG. This signal varies in frequency from approximately 50 Hz to 1000 Hz. Its amplitude varies from approximately 10 uV to 1 mV depending on properties such as the size of the muscle and the amount of exertion. Another common signal measured by electrodes is the electroencephalogram or EEG. This is the signal caused by neural activity in the brain. It contains frequencies from less than 1 Hz up to 50 Hz and amplitudes which are usually less than 10 uV.

The exemplary embodiments described above also have focused on the electrical circuits 106, 206, 906 and 1006 as being guidance and navigation circuitry. It is understood that this description is provided by way of example and not by way of limitation. For example, other electrical systems may benefit from the improved sensor as described above. For example, systems relating to needle control in textile weaving, small-volume pumping devices, micro-positioning machinery, cutting tools, mirrors, etc., stabilizing mechanical arrangements, fiber optics, vibration control, ultrasonic cleaners and welders, deep water hydrophones, medical probes, piezoelectric actuators, and toys/games. For example, a manufacturer has embedded piezoelectric materials in skis in order to damp out the vibrations of the skis and help keep the ski edges in contact with the snow. The piezoelectric material converts each mechanical vibration into an electric voltage, which is processed by a semiconductor electronic circuit. The circuit then sends a counter voltage to the piezoelectric material, which produces an opposing mechanical force to damp out the vibrations.

What is claimed is:

1. A system comprising:
   an accelerometer having an output;
   an enhancement circuit, coupled to the output of the accelerometer, the enhancement circuit comprising:
      a counter that counts a number of leading edges of pulses in the output of the accelerometer over a selected period of time;
      a comparator, responsive to the counter, that determines when the count in the selected period of time falls outside a selected range of values; and an output circuit, responsive to the comparator, that is adapted to replace the output of the accelerometer with a value in the selected range when the comparator determines that the value is outside the selected range; and
a guidance and navigation system, coupled to the accelerometer module, that receives the enhanced output of the accelerometer from the output circuit of the enhancement circuit.

2. The system of claim 1, wherein the accelerometer provides a square wave output.

3. The system of claim 1, wherein the accelerometer comprises a vibrating beam accelerometer with two vibrating beams.

4. The system of claim 1, wherein the counter counts leading edges over a 0.5 millisecond interval.

5. The system of claim 1, wherein the output circuit replaces an anomalous output value with a zero acceleration value.

6. The system of claim 1, wherein the output circuit replaces an anomalous output value with an interpolated value.

7. The system of claim 1, wherein the output circuit replaces an anomalous output value with a value derived from a good value from a complementary vibrating beam.

8. A circuit for enhancing an output of a sensor, the circuit comprising:
a counter that counts the number of leading edges of the pulses in the output of the sensor over a selected period of time;
a comparator, responsive to the counter, that determines when the value of the output in the selected period of time falls outside a selected range of values; and
an output circuit, responsive to the comparator and the counter, that is adapted to replace the measure of the output of the sensor with a value in the selected range when the comparator determines that the value is outside the selected range.

9. The circuit of claim 8, wherein the counter counts leading edges in a square wave received from the sensor.

10. The circuit of claim 8, wherein the counter determines a measure of the output of an accelerometer.

11. The circuit of claim 8, wherein the output circuit replaces an anomalous measure of the output of the sensor with a predetermined value.

12. The circuit of claim 8, wherein the output circuit replaces an anomalous measure of the output of the sensor with an interpolated value.

13. The circuit of claim 8, wherein the output circuit replaces an anomalous measure of the output of the sensor with a derived value.

14. A system, comprising:
a sensor adapted to monitor a stimulus and to provide an output;
an enhancement circuit, responsive to the sensor, the enhancement circuit adapted to override anomalous readings from the sensor to produce an enhanced output;
an electronic circuit, responsive to the enhancement circuit, the electronic circuit adapted to use the enhanced output signal to perform a selected function, wherein the enhancement circuit comprises:
a comparator that determines when the measure of the output of the sensor falls outside a selected range of values; and
an output circuit, responsive to the comparator, that is adapted to replace the measure of the output of the sensor with a value in the selected range when the comparator determines that the value is outside the selected range.

15. The system of claim 14 wherein the sensor comprises an accelerometer.

16. The system of claim 14, wherein the electronic circuit comprises a guidance and navigation system.

17. The system of claim 14, wherein the enhancement circuit comprises a filter with a bandwidth selected that passes output signals with frequencies within the normal operating range of the sensor.

18. The system of claim 14, wherein the enhancement circuit further comprises:
a counter that determines a measure of the output of the sensor over a selected period of time, wherein the comparator, responsive to the counter, determines when the measure of the output of the sensor in the selected period of time falls outside the selected range of values, and wherein the output circuit, responsive to the counter, is adapted to replace the measure of the output of the sensor with the value in the selected range when the comparator determines that the value is outside the selected range.

19. A system comprises:
a sensor adapted to monitor a stimulus and to provide an output;
an enhancement circuit, responsive to the sensor, the enhancement circuit adapted to override anomalous readings from the sensor to produce an enhanced output;
an electronic circuit, responsive to the enhancement circuit, the electronic circuit adapted to use the enhanced output signal to perform a selected function, wherein the enhancement circuit comprises:
a processing circuit, responsive to the output of the sensor, the processing circuit adapted to determine when the output of the sensor is outside the normal operating range of the sensor; and
an output circuit, responsive to the processor, for providing the output of the sensor to the electronic circuit when the output of the sensor is within the normal operating range of the sensor and for providing a modified output to the electronic circuit when the output of the sensor is outside of the normal operating range of the sensor.

20. An enhancement circuit for a sensor, the enhancement circuit comprising:
an input adapted to be coupled to an output of the sensor;
an output adapted to be coupled to an electronic system; and
means, responsive to the input and coupled to the output, for suppressing an anomalous output from the sensor from being transmitted to the electronic circuit, wherein the means for suppressing comprises:
a counter that determines a measure of the output of the sensor over a selected period of time;
a comparator, responsive to the counter, that determines when the measure of the output of the sensor in the selected period of time falls outside a selected range of values; and
an output circuit, responsive to the comparator and the counter, that is adapted to replace the measure of the output of the sensor with a value in the selected range when the comparator determines that the value is outside the selected range.

21. The enhancement circuit of claim 20, wherein the means for suppressing comprises a filter with a bandwidth selected that passes output signals with frequencies within the normal operating range of the sensor.

22. An enhancement circuit for a sensor, the enhancement circuit comprises:
- an input adapted to be coupled to an output of the sensor;
- an output adapted to be coupled to an electronic system; and
- means, responsive to the input and coupled to the output, for suppressing an anomalous output from the sensor from being transmitted to the electronic circuit, wherein the means for suppressing comprises:
  - a processing circuit, responsive to the output of the sensor, the processing circuit adapted to determine when the output of the sensor is outside the normal operating range of the sensor; and
  - an output circuit, responsive to the processor, for providing the output of the sensor to the electronic circuit when the output of the sensor is within the normal operating range of the sensor and for providing a modified output to the electronic circuit when the output of the sensor is outside of the normal operating range of the sensor.

* * * * *